ALL-MAGNETIC AUDIO AMPLIFIER SYSTEM

Filed June 18, 1956 3 Sheets-Sheet 1

INVENTORS
J. J. SUOZZI
E. T. HOOPER JR.

BY

ATTORNEYS

ALL-MAGNETIC AUDIO AMPLIFIER SYSTEM

Filed June 18, 1956 3 Sheets-Sheet 2

INVENTORS
J. J. SUOZZI
E. T. HOOPER JR.

BY [signature]
[signature]
ATTORNEYS

ALL-MAGNETIC AUDIO AMPLIFIER SYSTEM

Filed June 18, 1956 3 Sheets-Sheet 3

INVENTORS
J. J. SUOZZI
E. T. HOOPER JR.

BY

ATTORNEYS 2,868,877

ALL-MAGNETIC AUDIO AMPLIFIER SYSTEM

Edward T. Hooper, Jr., Hyattsville, Md., and Joseph J. Suozzi, Morristown, N. J., assignors to the United States of America as represented by the Secretary of the Navy Application June 18, 1956, Serial No. 592,223

18 Claims. (Cl. 179—1)

(Granted under Title 35, U. S. Code (1952), sec. 266)

The invention described herein may be manufactured and used by or for the Government of the United States of America for governmental purposes without the payment of any royalties thereon or therefor.

The present invention relates to an all-magnetic audio amplifier system and more particularly to a half-wave audio magnetic amplifier energized from a magnetic power supply.

Although magnetic amplifiers have been used as audio amplifiers, the necessity of generating the high-carrier frequency has made their use impratical. The objection to the use of rotating machinery to produce this carrier is the mechanical problem introduced by moving parts, while the use of the vacuum-tube oscillator as a high-frequency source introduces the disadvantages of fragility, short life and increased maintenance problems. Although switching transistors associated with saturable reactors can be used to produce a high-frequency carrier, problems of performance and reliability arise because of the early stage of development.

Notwithstanding the above obstacles, it is desirable to utilize magnetic amplifiers for audio frequency amplification due to their attendant advantages of ruggedness, dependability, maintenance-free long life, and no need for warmup. In order to take advantage of these highly desirable magnetic amplifier characteristics, it would be advantageous to use the magnetic amplifier with a high-frequency power supply of essentially the same nature, namely a static frequency multiplier consisting of transformerlike devices and capacitors. However, in the past when these types of multipliers have been used, the resulting unit was prohibitively large and introduced distortion into the system.

Audio amplification by magnetic amplifier means has been proposed heretofore by the utilization of a pair of full-wave magnetic amplifiers that are designed to operate from an audio frequency carrier source. Due to the poor speed of response inherent in full-wave magnetic amplifiers, the full-wave magnetic amplifier has a bandwidth which is undesirably narrow for audio amplification purposes and therefore does not readily lend itself to such applications. Furthermore, full-wave magnetic amplifiers are bulky, numerous in componential make-up, and require a relatively high operating potential which presents a large power drain on the power supply.

The general purpose of this invention is to amplify audio frequency signals by the combination of magnetic amplifier means operated from a magnetic power supply and which combination possesses none of the above disadvantages.

The combination contemplated by the present invention to accomplish this purpose consists of a magnetic audio-frequency power supply providing an audio frequency carrier signal, a pair of equally rated half-wave bridge-type magnetic amplifiers connected in phase opposition across the power supply to thus appear as an A. C. load to the power supply, the operating potential for the magnetic amplifiers being the audio frequency carrier signal, an audio intelligence signal source connected to modulate the carrier in the magnetic amplifiers in accordance with the intelligence signal, and an audio reproducer connected to the output of the magnetic amplifiers to produce amplified audible reproductions of the intelligence signal.

More specifically, the magnetic amplifiers are connected in cascade with the intelligence signal source, and the magnetic power supply may operate off of a single-phase or three-phase source. In addition, the magnetic power supply is a frequency multiplier which may consist of three single-phase frequency triplers or a three-phase frequency tripler succeeded by two single-phase frequency triplers. Moreover, the three-phase tripler is of the three-phase four-wire type employing both linear and saturable reactors; and the single-phase tripler may be either of the transformer-type employing both linear and saturable reactors or may be of the bridge-type which likewise employs both linear and saturable reactors. Furthermore, in the combination of single-phase triplers, the triplers may be all of the bridge-type, or all of the transformer-type, or a combination of both.

If desired, as herein described, the fidelity of the system may be improved by interposing wave-shaping filter circuits between the triplers and in the output of the half-wave magnetic amplifiers to smooth out the waveforms and substantially suppress undesired harmonics.

Although the system herein disclosed is described as operating off of either a single-phase 400 C. P. S. source or a three-phase 400 C. P. S. source to produce a carrier of 10,800 C. P. S. for operating the half-wave magnetic amplifiers, it is to be understood that the system can be designed to operate off of a single-phase or three-phase 60 C. P. S. source without deviating from the spirit and scope of the invention. Also, the half-wave magnetic amplifiers may be operated from a carrier signal other than 10,800 C. P. S., and any number of frequency triplers may be employed.

With the foregoing in mind, it is an object of the present invention to provide an all-magnetic audio frequency amplifier system.

It is another object to amplify audio signals by utilization of a magnetic amplifier operating from a magnetic power supply.

Another object of the invention is the provision of a versatile audio magnetic amplifier system capable of utilizing any conventional bridge, phase-reversible output type of half-wave magnetic amplifier.

Still another object is to provide an audio magnetic amplifier having low power requirements.

A further object of the invention is to provide an audio magnetic amplifier having low power drain.

A still further object is to provide an audio amplifier characterized by the advantages of reliability, ruggedness, long life, instant warm-up, high speed of response, and maintenance-free long life.

Another further object is the provision, in an audio amplifier system, of a magnetic amplifier which appears as an A. C. load to the magnetic amplifier power supply.

A significant object is to supply a high-frequency operating potential to a magnetic amplifier from completely static devices, namely magnetic transformer-like devices.

Another significant object is to provide an all-magnetic audio amplifier system which is compact in size, light in weight, and reliable in performance.

A further object is to provide an audio magnetic amplifier having an improved bandwidth of the order of 90 to 3000 C. P. S.

Another further object is to provide an audio magnetic amplifier having an improved signal to noise ratio.

An important object of the invention is the provision of an all-magnetic audio amplifier system having a good quality output comparing favorably to vacuum tube audio systems.

A primary object of the invention is the provision of a pair of half-wave bridge magnetic amplifiers operated from a series of cascaded magnetic frequency triplers to provide amplification of an audio intelligence signal applied to the control circuit of the magnetic amplifiers.

Another primary object is to provide an audio magnetic amplifier capable of being operated from a single-phase or three-phase source.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 1:
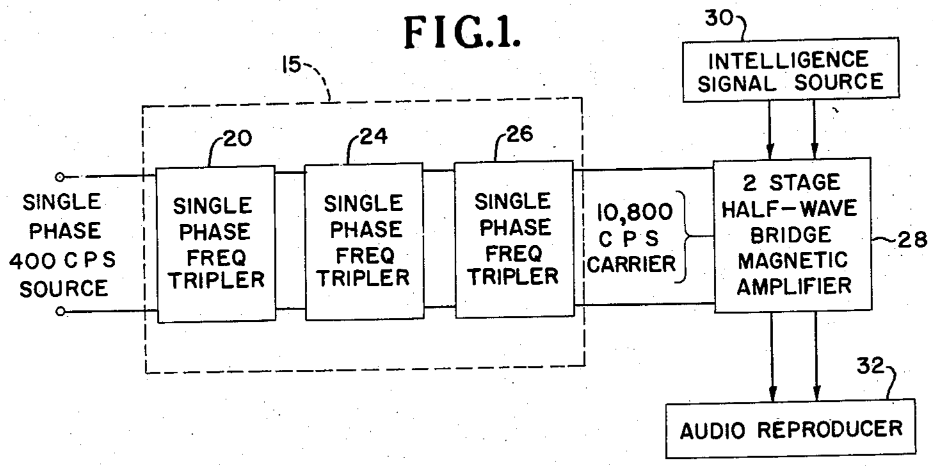
Fig. 1 is a block diagram of the basic concept of the invention adapted for operation from a single-phase source.

Referring now to the drawings, wherein like reference characters designate like or corresponding parts throughout the several figures, there is shown in Fig. 1 a block diagram of an all-magnetic audio amplifier system in accordance with the invention comprising a magnetic, or static, frequency multiplier, denoted generally at 15, which is operated from a single-phase 400 C. P. S. source, preferably of 115 volts. The multiplier 15 consists of three single-phase triplers 20, 24 and 26, of the reactor core type, connected in cascade to produce the 27th harmonic of the source, namely a signal having a frequency of 10,800 C. P. S. This signal is applied as a high-frequency carrier to the power windings of a two stage half-wave bridge magnetic amplifier 28 which has the control windings thereof connected in cascade, as will subsequently become apparent, with an intelligence signal source 30, the intelligence signal modulating the high-frequency carrier flowing through the power windings whereby the output of the amplifier 28 includes the amplified intelligence signal in demodulated form by virtue of the inherent demodulation characteristic of half-wave bridge magnetic amplifiers. An audio reproducer 32 produces audible reproductions of the magnetic amplifier output.

Obviously improved fidelity may be obtained by employing a higher carrier-frequency, but utilization of a 10,800 C. P. S. carrier is preferable since this entails the least amount of frequency multiplication while allowing a sufficient bandwidth to be obtained. The single-phase triplers 20, 24 and 26 may all be of the single-phase transformer-type frequency tripler, or of the single-phase bridge type, or a combination of both.

Figure 3:
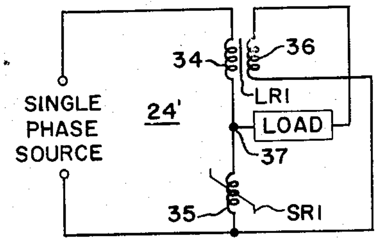
(PRIOR ART) FIG. 3.
Fig. 3 is a modification of a conventional transformer-type single-phase tripler adapted for incorporation in the systems of Figs. 1 and 2 as any or all of the single-phase triplers therein employed.

A single-phase transformer-type tripler which is suitable for use as a single-phase tripler in the instant invention is disclosed in U. S. Patent No. 1,118,935 to M. Joly. Since a primary consideration of the invention is to minimize the physical size of the system, it is deemed expedient to employ a modification of the tripler described in the aforesaid U. S. patent, which modification uses one less winding. The modified transformer-type tripler is shown as 24′ in Fig. 3 and consists of a linear reactor LR1 having a winding 34 connected in series with a winding 35 on saturable reactor SR1 across the input, a second winding 36 on linear reactor LR1 serially connecting the load across winding 35. The operation of the circuit of Fig. 3 is similar to that in U. S. Patent No. 1,118,935, reference being made thereto for a more detailed description of the operation thereof.

A single-phase bridge-type tripler suitable for use in the herein described system is disclosed in U. S. Patent No. 1,678,995 to O. Von Bronk and is shown in Fig. 4 as 26′ to consist of a linear reactor LR2, a saturable reactor SR2, and a pair of windings on each reactor connected to form a bridge.

The operation of single-phase triplers depends on the superposition of a sinusoidal and distorted voltage or current. A linear reactor is used to produce the sinusoidal voltage and necessary phase shift while a saturable reactor produces the desired distorted waveform. The superposition of the two is accomplished by the transformer-type circuit of Fig. 3 or the bridge-type circuit of Fig. 4.

Figure 4:
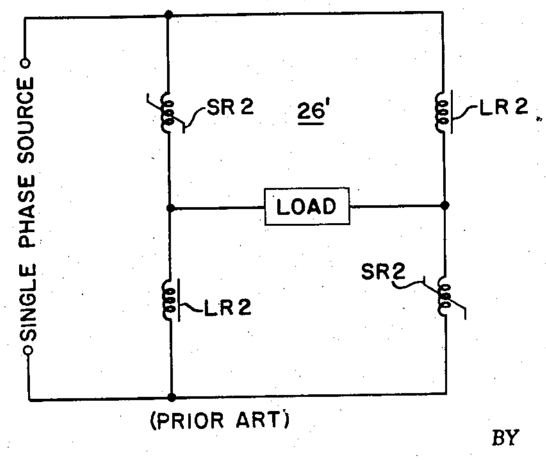
Fig. 4 is a conventional bridge-type single-phase tripler suitable for use as any of the single-phase triplers of Figs. 1 and 2.
Figure 5:
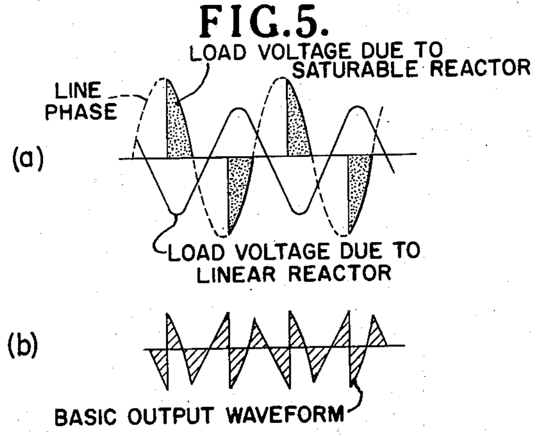
Fig. 5(*a*) illustrates the superposition of the sinusoidal and distorted wave forms in either of the circuits of Figs. 3 or 4, while Fig. 5(*b*) illustrates the basic output waveform from either of the circuits of Figs. 3 or 4 before filtering.

Fig. 5(*a*) shows the two waveforms contributed by the action of the linear and saturable reactors in either of the circuits of Figs. 3 and 4; while Fig. 5(*b*) shows the basic output waveform of either of the circuits of Figs. 3 and 4. This basic output is a summation of the aforestated two waveforms and is rich in third harmonic. By means of appropriate tuned circuits, the basic output waveform can be made sinusoidal, such tuned circuits being included in the load circuit of the triplers 22, 24 and 26 as will become apparent with the discussion of Fig. 12.

As stated hereinbefore, the triplers 22, 24 and 26 may all consist of the circuit of Fig. 3, or may all consist of the circuit of Fig. 4 or may all consist of the circuit of Fig. 4, or may be a combination of Figs. 3 and 4.

Figure 2:
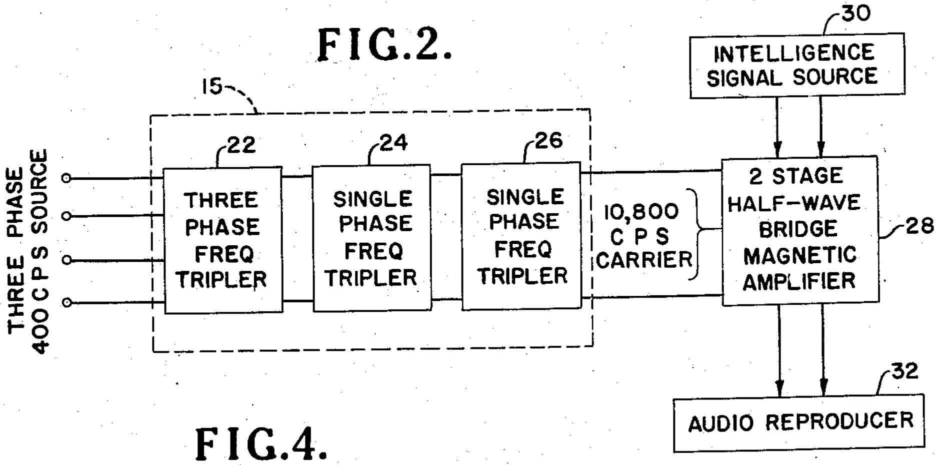
Fig. 2 is a block diagram of the basic concept of the invention suitable for operation from a three-phase source.

Fig. 2, other than utilizing a three-phase frequency tripler 22 as the leading tripler of multiplier 15 for adapting the system to operate from a three-phase source, is identical in circuitry and in operation to the system of Fig. 1. Triplers 24 and 26 may both be of the type in Fig. 3 or in Fig. 4, or a combination of both Figs. 3 and 4.

Figure 6:
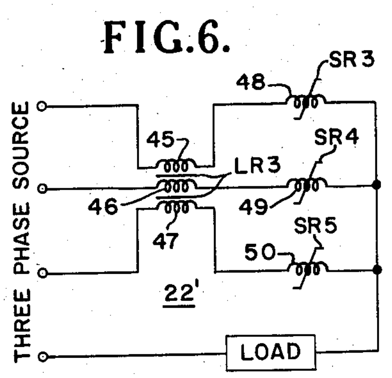
Fig. 6 is a modification of a conventional three-phase, four-wire tripler for use as the tripler in the system of Fig. 2.
Figure 7:
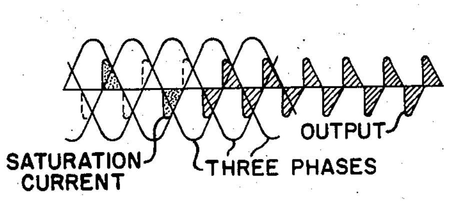
Fig. 7 illustrates the three-phase current flow through the tripler of Fig. 6 with the consequent basic output waveform before filtering.

A suitable three-phase frequency tripler for use in the system of Fig. 2 is disclosed in U. S. Patent No. 2,451,189 to Alexanderson et al. and comprises three parallel branches of a pair of serially connected windings, each winding of the pair being wound on respective linear and saturable reactors. To obtain the advantages of this tripler without excessive increase in the size of the audio amplifier system, the invention utilizes a modification of the aforedescribed patented three-phase tripler, which modification employs only a single linear reactor and is shown in Fig. 6. The modification illustrated in Fig. 6 consists of three windings 45, 46, and 47, connected in separate parallel circuits and wound on a common linear reactor LR3, and of three saturable reactors SR3, SR4, and SR5 having respective windings 48, 49 and 50 connected in series with windings 45, 46 and 47, respectively. The modification shown in Fig. 6 is made possible by the switching action of the saturable reactors. Since only one saturable reactor will be saturated at any instant of time, the linear reactor LR3 is effective in only one phase at a time. The basic output waveform of Fig. 6 is shown in Fig. 7 and is derived in the same manner as taught in U. S. Patent No. 2,451,189, the output waveform of Fig. 6 differing from that of the patent only in having rounded output peaks instead of pointed output peaks due to using only a single linear reactor. This peaking difference does not adversely affect the audio amplifier of the invention. The tripler of Fig. 6 produces a single-phase output which is rich in third harmonics and can be made sinusoidal by appropriate tuning means.

The magnetic amplifier designed for operation with a magnetic multiplier, or magnetic high-frequency power supply, must possess certain characteristics. Its power demand must be low since limited power is available, and overdriving the carrier source will produce distortion and spurious frequencies in the audio output. Also, the amplifier should draw little or no direct current from the source since this too disturbs the operation of the magnetic frequency multiplier and produces distortion. A further requirement for the amplifier is a bandwidth sufficiently high to reproduce audio signals satisfactorily.

To meet the foregoing requirements, the invention uses a pair of identical, equally-rated, half-wave bridge magnetic amplifiers connected in phase opposition across the output of the magnetic multiplier, each half-wave bridge amplifier including a pair of saturable reactors, appropriate selenium rectifiers, and other static components. Any conventional half-wave bridge magnetic amplifier may be employed such, for example, of the types shown in U. S. Patent No. 2,734,165 to C. W. Lufcy or of the type employing a portion of the power windings to establish the operating flux level during the inactive half-cycles of the power windings, the latter being preferably due to the decrease in number of components required. Also, the two half-wave magnetic amplifiers are connected for operation in cascade as taught in the aforesaid U. S. Patent No. 2,734,165 or as shown by the first two stages of Fig. 1 of U. S. Patent 2,636,150 to H. F. McKenney et al.

Due to the fact that the half-wave magnetic amplifiers are equally rated and connected in phase opposition across the output of the magnetic multiplier, the two half-wave magnetic amplifiers appear as an A. C. load to the multiplier since the half-wave magnetic amplifiers draw approximately the same amount of direct current.

The complicated nature of control in the magnetic amplifier is such as to cause both frequency and nonlinear distortion under certain conditions. These effects are apparent upon referring to the waveforms of Figs. 8, 9, 10 and 11, wherein the respective (*a*) waveforms illustrate the superposition of the modulating signal and carrier signal in the half-wave magnetic amplifiers and the respective (*b*) waveforms show the resultant output from the half-wave magnetic amplifiers. The shaded portion in the (*a*) waveforms indicate the extent of modulation control imposed upon the carrier by the intelligence signal during the inactive, or control, half-cycle of the power windings in the half-wave magnetic amplifiers; and the speckled portions of the (*b*) waveforms occur during the firing, or conductive, half-cycles of the power windings and are the resultant of the shaded areas of waveforms (*a*) occurring during the preceding half-cycles.

Figure 8:
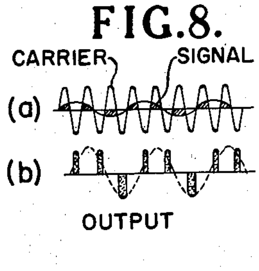
Figs. 8, 9, 10 and 11 illustrate the superposition of the modulating signal and carrier signal with the resultant output from the audio magnetic amplifier for various frequency and phase conditions.
Figure 9:
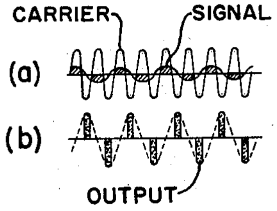
Figure 10:
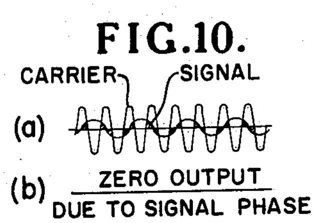
Figure 11:
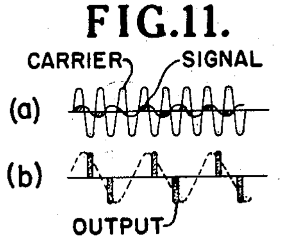

By nature the half-wave magnetic amplifier is controlled during alternate half-cycles of the carrier; and the portion of the signal that is effective in controlling the amplifier is phase-reversible, the phase and magnitude of the output on each half-cycle being determined by the phase and magnitude of the effective control half-cycles. For signal frequencies below half the carrier-frequency, e. g., 3600 C. P. S. as shown in Fig. 8, the output is essentially 3600 C. P. S. At half the carrier-frequency, i. e., 5400 C. P. S., the output is either 5400 C. P. S. as in Fig. 9, or zero as in Fig 10, depending on the phase of the signal with reference to the carrier. For signal frequencies greater than half and less than the carrier-frequency, e. g., 7200 C. P. S., the output is seen to contain a large component 3600 C. P. S. as shown in Fig. 11. This beat frequency between the signal and carrier-frequencies is the source of the nonlinear distortion mentioned hereabove. In addition, for signal frequencies approaching half the carrier frequency, reduced output is obtained depending on the relative phase between the signal and the carrier.

Despite these adverse effects caused by the nature of the amplifier, the over-all frequency and nonlinear distortion of the audio magnetic amplifier working from a magnetic power supply is less than 10 percent over the bandwidth of the system. This is exclusive of the carrier which is suppressed by appropriate filters, as will hereinafter become apparent.

Figure 12:
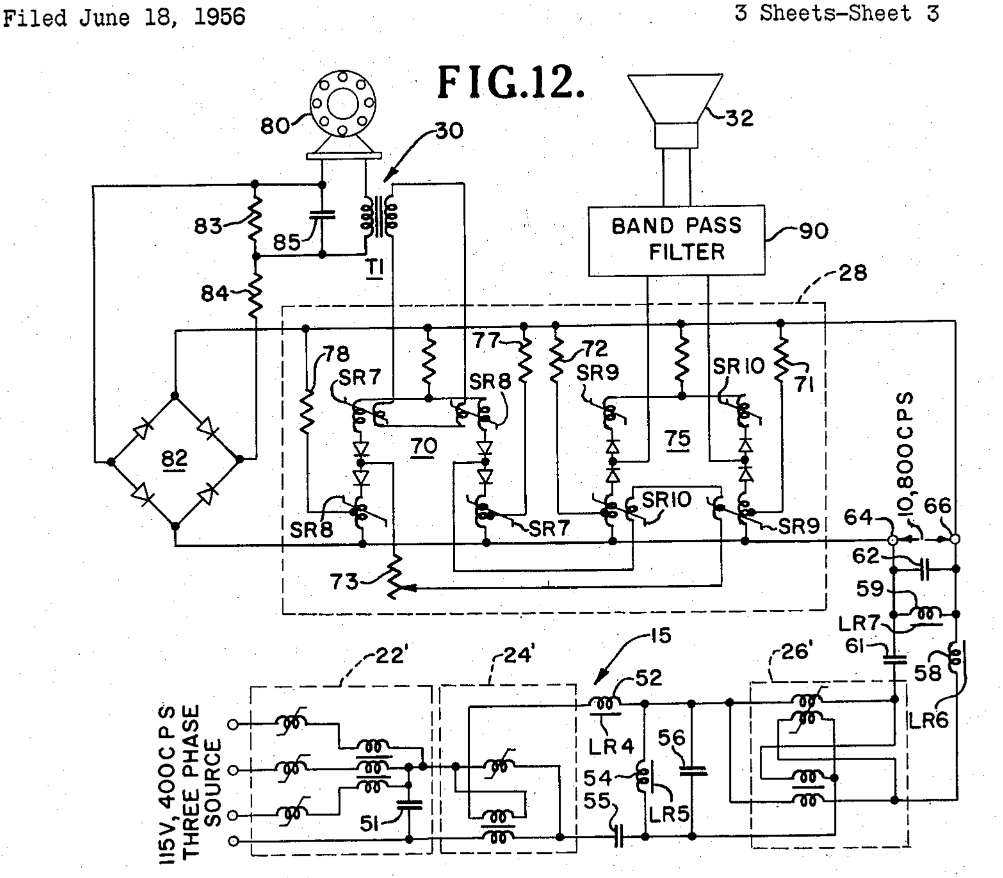
Fig. 12 is a wiring diagram of the system of Fig. 2 and is arranged to incorporate the combination of the single-phase triplers of Figs. 3 and 4 to more clearly exemplify the interchangeability of the single-phase triplers of Figs. 3 and 4.
Figure 13:
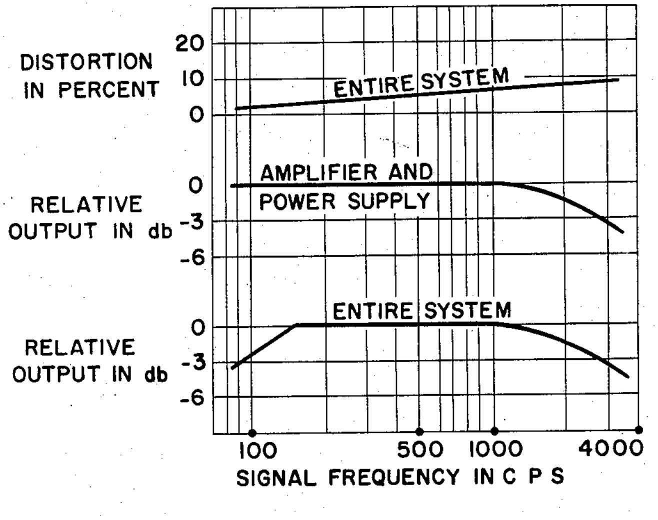
Fig. 13 illustrates the performance characteristics of the circuit of Fig. 12.

Performance curves of the subsequently to be described audio magnetic amplifier of Fig. 12 are shown in Fig. 13. As is apparent from Fig. 13, the bandwidth (3 db down) of the magnetic audio amplifier is zero to 3000 C. P. S. Since the upper limit of the human voice falls within this range and since all musical instruments, with the exception of the higher notes of the piano and melody chromatic harmonica, also fall within the zero to 3000 C. P. S., the audio system of Fig. 12 provides a dependable, rugged and long life audio amplification means suitable for phonograph recording and the like. It is also noted from Fig. 13 that the distortion between zero and 400 C. P. S. is less than 5%. Since most speaking voices fall within the range of 80 to 400 C. P. S., the audio system of Fig. 12 is admirably suited for intercom systems.

Referring now to Fig. 12, wherein is shown a wiring diagram of one possible embodiment utilizing a three-phase magnetic tripler in conjunction with a single-phase transformer-type magnetic tripler and a single-phase bridge-type tripler for operation from a three-phase source, the magnetic multiplier 15 consists of the three-phase tripler 22′ of Fig. 6 connected to a three-phase, 115 v., 400 C. P. S. source and having a wave smoothing capacitor 51 across the output thereof, the single-phase transformer-type tripler 24′ of Fig. 3 as the second multiplying stage, and the single-phase bridge tripler 26′ as the last multiplying stage. Interposed between triplers 24′ and 26′ is a wave-shaping filter circuit to sinusoidally smooth the output of tripler 24′, the wave-shaping filter circuit being composed of inductances 52 and 54 on linear reactors LR4 and LR5 with capacitors 55 and 56. A similar wave-shaping circuit, consisting of inductances 58 and 59 on linear reactors LR6 and LR7 with capacitors 61 and 62, is connected across the output of tripler 26′ to provide a substantially sinusoidal carrier frequency of 10,800 C. P. S. at the multiplier output terminals 64 and 66.

A pair of half-wave bridge magnetic amplifiers, indicated generally at 70 and 75, have their power winding circuits connected across the output terminals 64 and 66 with the respective rectifiers thereof oppositely poled so that bridge amplifier 70 conducts on alternate predetermined half-cycles, the positive half-cycles for example, of the carrier appearing at terminals 64 and 66 while bridge amplifier 75 conducts on the other alternate half-cycles, the negative half-cycles for example, of the aforesaid carrier. In order to minimize the size of the bridge amplifiers by utilizing the minimum number of components, the operating flux level, or biasing, is obtained by passing carrier current through a portion of the power windings on their respective inactive half-cycles by means of resistors 71, 72, 77 and 78. In lieu of this arrangement, the operating flux level may be obtained by resistors shunting the rectifiers as taught in the aforesaid McKenney et al. patent or by the expedients disclosed in the hereinabove mentioned Lufcy patent. The control windings, which form the input circuit, of amplifier 70 are connected to the secondary of transformer T1 to receive the intelligence signals applied by an intelligence source, indicated generally at 30; and the output of amplifier 70 is applied through a volume control resistor 73 to the control windings of amplifier 75 to thereby effectively connect amplifiers 70 and 75 in cascade.

The corresponding components of bridge amplifiers 70 and 75 are selected to have substantially equal impedances whereby the bridge amplifiers are substantially equally rated. Since the bridge amplifiers are substantially equally rated and since they are connected in phase opposition across terminals 64 and 66, the combined effect of amplifiers 70 and 75 is to present an A. C. load to the magnetic multiplier 15. As is well known to those skilled in the art, half-wave bridge magnetic amplifiers of the type contemplated for use in the audio system of this invention inherently are characterized by push-pull operation, i. e., the direction of the output current flow being determined by the polarity of the signals applied to the control windings. Consequently, the output of the amplifiers 70 and 75 is of the phase-reversible type. In view of these facts, fluctuating signals applied to the input of the bridge amplifiers have corresponding fluctuating signals in the output of the bridge amplifiers. In this manner, audio signals such as speech or music, for example, applied to the input of the bridge amplifiers appear in amplified form in the output thereof.

The audio amplifier is driven by a carbon microphone 80 connected to the primary of transformer T1. The direct current operating potential for microphone 80 is obtained from the 10,800 C. P. S. voltage by means of a full-wave rectifier 82 and filter means consisting of resistors 83 and 84 and capacitor 85. The output of the bridge amplifier 75 is fed through a bandpass filter 90, designed to pass frequencies of the intelligence signal and to suppress undesired harmonics, to the voice coil of a permanent magnet speaker 32. Bandpass filter 90 may be omitted, if desired, without adversely affecting the reproducibility of the system.

In operation, the magnetic multiplier 15 produces a predetermined harmonic, in this case the 27th, of the supply source as a high-frequency carrier signal and applies this as the operating potential to the phase-opposing bridge amplifiers 70 and 75. The audio intelligence signals supplied to microphone 80 are applied through transformer T1 to the control winding of amplifier 70 to thereby modulate the carrier in accordance with the fluctuations of the intelligence signals. The modulated carrier signals appear in amplified demodulated form in the output of the bridge amplifier 75, by virtue of the inherent demodulation function of half-wave bridge magnetic amplifiers. The speaker 32 is effective to produce amplified audible reproductions of the intelligence signals applied to microphone 80.

A magnetic multiplier and bridge amplifier built in accordance with the wiring diagram of Fig. 12 occupied a volume of 5 by 5 by 6 inches. The bandwidth of the entire system of Fig. 12 was found to be 90 to 3000 C. P. S. as shown in Fig. 13. The fall off below 90 C. P. S. is attributable to the input circuit and the frequency response of the speaker.

The audio output power was found to be 2.5 watts with less than ten percent distortion. The system of Fig. 12 possesses all the advantages of magnetic amplifiers, i. e., reliability, ruggedness, long life, instant warm up, and a usable temperature range limited only by the selenium rectifiers.

Because of the instant warm up characteristic, the system will operate with no stand-by power since the unit need be excited only when voice amplification is desired. Thus, a push-to-talk switch could be used as an on-off power switch. This would result in the complete elimination of quiescent power and the attendant heat dissipation problem.

A further by-product of this characteristic is the possibility of derating the frequency multiplier and amplifier with a resultant decrease in size when the duty cycle permits. The unit of Fig. 12 was designed for 100 percent duty cycle, a condition not often encountered in actual practice. With the additional advantages of potting the entire amplifier and power supply, an audio system of complete dependability and long life is feasible and hereby realized. The audio system herein disclosed is suitable for intercommunication, facsimile reproduction, public address, and battle command systems.

It is to be understood that magnetic frequency triplers other than those hereindisclosed may be utilized without deviating from the scope of the invention, the selection of the herein disclosed magnetic triplers being guided by the consideration of attaining a small, compact unit.

Although the system is herein described as operating from a single-phase or three-pase 400 C. P. S. source, it is to be understood that a single-phase or three-phase 60 C. P. S. source may be employed with a suitable number of triplers. Also, a carrier frequency other than that specifically stated herein may be used. If desired, a fourth tripler can be inserted in the system so as to operate on a 32,400 C. P. S. carrier.

Obviously many modifications and variations of the present invention are possible in the light of the above teachings. It is therefore to be understood, that within the scope of the teachings herein and the appended claims, the invention may be practiced otherwise than as specifically described.

What is claimed as new and desired to be secured by Letters Patent of the United States is:

1. A magnetic audio amplifier system comprising a magnetic power supply providing a high-frequency carrier signal, a pair of cascaded half-wave magnetic amplifier stages connected to receive said carrier signal as the operating potential therefor, the stages of said magnetic amplifier being connected to pass current of alternate half-cycles of said carrier signal to thus appear as an alternating current load to said power supply, an intelligence signal source connected to modulate the carrier signal in said magnetic amplifier in accordance with the intelligence signal, and an intelligence reproducer connected to receive the output from the second of said cascaded stages to produce amplified reproductions of the intelligence signal.

2. The magnetic audio amplifier system of claim 1, wherein said magnetic power supply comprises a frequency multiplier including a plurality of cascaded magnetic harmonic generators operating from a standard power source, said generators being of equal harmonic power.

3. The magnetic audio amplifier system of claim 2, wherein said harmonic generators are magnetic frequency triplers of the single-phase type and each includes inductances wound on saturable and linear reactors.

4. The magnetic audio amplifier system of claim 3, wherein said single-phase magnetic triplers are single-phase bridge-type triplers each including a saturable reactor, a linear reactor, and a pair of windings on each reactor connected to form opposing legs of the bridge.

5. The magnetic audio amplifier system of claim 3, wherein said single-phase magnetic triplers are single-phase transformer-type triplers each including a saturable reactor, a linear reactor, a winding on each reactor connected in series, and a second winding on the linear reactor serially connecting the output of the tripler across the winding on the saturable reactor.

6. A magnetic audio amplifier system comprising a magnetic frequency multiplier providing a high-frequency carrier signal and including a plurality of cascaded magnetic frequency triplers; at least one of said triplers being of the single-phase transformer-type and comprising a saturable reactor, a linear reactor, a winding on each reactor connected in series, and a second winding on the linear reactor serially connecting the output of the transformer type tripler across the winding on the saturable reactor;

at least one of said triplers being of the single-phase bridge type and comprising a saturable reactor, a linear reactor, and a pair of windings on each reactor connected to form opposing legs of the bridge; a pair of cascaded, equally rated half-wave bridge magnetic amplifiers connected in phase opposition across said multiplier to thus appear as an alternating current load thereto, the high-frequency carrier signal of said multiplier providing the operating potential to said half-wave amplifiers; an intelligence signal source connected to the input circuit of the first of said cascaded amplifiers to modulate the carrier signal in said half-wave amplifiers in accordance with the intelligence signal; and an intelligence reproducer connected to receive the output of the second of said cascaded amplifiers to produce amplified reproductions of the intelligence signal.

7. The magnetic audio amplifier system of claim 6, wherein said carrier and intelligence signals are in the audio range, and wherein said amplified reproductions are audible.

8. The magnetic audio amplifier system of claim 7, further including wave-shaping filter means interposed between the magnetic triplers to sinusoidally smooth out the waveform outputs of the triplers.

9. The magnetic audio amplifier system of claim 7, wherein said multiplier operates from a three-phase source and includes three triplers in cascade, one of said triplers being of the single-phase transformer type, another of said triplers being of the single-phase bridge type, the remaining one of said triplers being of the three-phase type; said three-phase tripler comprising three parallel branches each including a pair of windings connected in series, one winding of each branch being wound on a respective saturable reactor, and the other windings of the three branches being wound on a common linear reactor, said three-phase tripler being the leading tripler in the cascade of triplers.

10. The magnetic amplifier system of claim 9, further including wave-shaping filter means interposed between the magnetic triplers to sinusoidally smooth out the waveform outputs of the triplers, said filter means including inductances wound on linear reactors and capacitors.

11. An all magnetic audio amplifier system comprising a magnetic audio-frequency power supply for providing an audio-frequency carrier signal, a pair of cascaded, equally-rated half-wave bridge-type magnetic amplifiers connected in phase opposition across said power supply to thus appear as an alternating current load thereto, the operating potential for the magnetic amplifiers being the audio-frequency carrier signal, an audio intelligence signal source connected to modulate the carrier in said bridge magnetic amplifiers in accordance with the intelligence signal thereof, and an audio reproducer connected to the output from the second of said cascaded magnetic amplifiers to produce amplified audible reproductions of the intelligence signal.

12. An all magnetic audio magnetic amplifier system comprising a magnetic multiplier connected to a supply source for producing an audio-frequency carrier signal, first and second half-wave bridge magnetic amplifiers connected in cascade in the order named, circuit means connecting said amplifiers in phase opposition across the output of said multiplier, an audio frequency intelligence source connected to the input of said first amplifier to modulate the audio carrier frequency currents flowing in said amplifiers in accordance with the intelligence of said intelligence source, and an audio reproducer connected to the output of said second amplifier to produce audible reproductions of the intelligence signal.

13. An audio amplifier system comprising a signal source of predetermined frequency, a pair of equally rated half-wave bridge magnetic amplifiers connected in cascade, magnetic means for multiplying said predetermined frequency to a predetermined multiple thereof and applying it in phase opposition to said pair of amplifiers as the operating potential thereof, means electrically associated with said amplifiers to modulate the frequency of said operating potential whereby a modulated carrier signal appears in the output of said amplifier, and means coupled to the output of said amplifier for utilizing said modulated carrier signal.

14. The audio amplifier system of claim 13, wherein said magnetic multiplying means comprises a magnetic frequency multiplier including a plurality of magnetic frequency triplers connected in cascade.

15. A claim according to claim 14, wherein the frequency triplers are of the single-phase type.

16. The device of claim 14 wherein at least one of said triplers is of the three-phase type and the others are of the single-phase type.

17. An audio amplifier system according to claim 16, wherein said three-phase tripler includes three parallel branches of serially connected saturable and linear reactors; and wherein said single-phase triplers include a saturable core reactor, a linear core reactor, and a pair of windings disposed on each of said reactors, one winding on said saturable core reactor being serially connected to one winding of said linear core reactor and the other windings of said core reactors also being connected in series.

18. In combination, a static frequency multiplier for connection to an alternating current source of fundamental frequency to develop in the output thereof an audio-frequency signal, a pair of substantially equally rated half-wave bridge magnetic amplifier stages each including reactor means with control and load windings disposed thereon and unilateral conductive devices in series with the load windings, circuit means for connecting said load windings with their respective unilateral conductive devices in parallel across the output of said multiplier for energization with said audio-frequency signal, the unilateral conductive devices being so phased that the load windings of one of said stages passes half-cycle currents of one polarity of said signal while the load windings of the other of said stages passes half-cycle current of opposite polarity of said signal, circuit connections for connecting the control winding of said other stage to receive the output of said one stage, an intelligence signal source connected to the control winding of said one stage to thereby modulate the currents flowing through the load windings in said stages, and an audio reproducer connected to receive the output from the load windings of said other stage.

References Cited in the file of this patent

UNITED STATES PATENTS

| | | |
|---|---|---|
| 1,682,768 | Osnos | Sept. 4, 1928 |
| 2,710,313 | Logan | June 5, 1955 |